3,112,204
TREATMENT OF VANILLA
Nicholas S. Yanick, Elmhurst, Ill., assignor to National Dairy Products Corporation, New York, N.Y., a corporation of Delaware
No Drawing. Filed Aug. 7, 1961, Ser. No. 129,564
4 Claims. (Cl. 99—140)

The present invention relates generally to vanilla extract, and, more particularly, it relates to the treatment of a solution of vanilla flavor components to provide an improved vanilla extract.

The extract obtained from vanilla beans is a widely-used flavoring material. The arts of properly curing the beans and of extracting and aging the flavor components of the beans are the basis for old and established industries.

Because there are relatively few areas in which vanilla vines may be grown, and also because of the extended curing procedures required to provide a properly cured bean, vanilla beans are presently quite costly, and, accordingly, the extract thereof is also relatively costly. Vanillin, which is an aromatic aldehyde responsible for a portion of the flavor of vanilla extract, may be synthesized economically, and synthetic vanillin has been used to fortify vanilla extract, thereby providing somewhat reduced costs. However, the full flavor spectrum of vanilla extract has not been capable of synthetic duplication, and products flavored with vanillin-fortified extract are generally less desirably flavored than those flavored with increased levels of unfortified vanilla extract.

Generally, vanilla extract is prepared by comminuting the beans and subjecting the comminuted beans to the action of a suitable solvent. The solvent which is in general use is a mixture of water and alcohol. The resultant solution of flavor components is separated from the vanilla bean residue, or marc, and may thereafter be aged to provide the vanilla extract of commerce. The terms "solution of extractable vanilla bean components," or simply "solution," are used throughout this specification to denote an alcoholic solution of extractable vanilla bean components whether aged or unaged.

The flavor strength of vanilla extract is related to the ratio of vanilla beans to solvent in the extraction process. The customary nomenclature of the flavor strength for a vanilla extract is the term "fold." At present, one-fold extract is that which has a flavor strength equivalent to the extractable components in 13.35 ounces of vanilla beans dissolved in solvent comprising 35 percent alcohol to comprise one gallon of solution. A two-fold extract is that which has a flavor strength equivalent to a one-gallon solution of twice the foregoing weight of extractable components.

It is a primary object of the present invention to provide a vanilla extract which has improved flavor properties. A more particular object of the present invention is to provide a vanilla extract of increased flavor strength. It is a further object of the present invention to treat a solution of extractable vanilla bean components to increase its flavor strength. Other objects and advantages of the present invention will become apparent from the following description and claims.

Generally, the present invention contemplates subjecting a solution of extractable vanilla bean components to particular conditions of temperature to provide a vanilla extract of increased flavor strength. An extract prepared in accordance with the present invention has desirable flavor characteristics while having increased flavor strength.

In this connection, a solution of extractable vanilla bean components may be obtained by various methods. One of the oldest methods of extracting these components uses a solvent comprising 35 percent alcohol at a temperature of about 54° C. for about 85 hours. In a method disclosed in United States Letters Patent No. 2,358,947, vanilla beans are extracted with a solvent comprising 20 percent alcohol at a temperature of about 120° C. for about two hours.

In accordance with the present invention, vanilla beans are extracted of their components by certain of the foregoing methods, or by other conventional methods, to provide a solution of vanilla flavor components. As pointed out hereinbefore, this extraction will normally be carried out using a solvent comprising water and alcohol.

Further in accordance with the present invention, the solution of extractable vanilla bean components is heated to a temperature between about 105° C. and 135° C. and is maintained thereat for between about 56 hours at the lower temperature and about 4 hours at the higher temperature. Preferably, the solution is heated to about 120° C. and maintained thereat for about 10 hours. The treated solution may thereafter be aged to allow the development of full flavor. There is obtained, in accordance with the present invention, a vanilla extract having a full flavor spectrum, and also having substantially increased flavor strength compared to the product obtained from the same vanilla bean by conventional methods of treatment.

It should be pointed out that the time during which the solution is maintained at the foregoing temperature is functionally related to the particular food product which is to be flavored, and that the treatment time is therefore somewhat variable. However, in order to enjoy the benefits of the present invention, the heat treatment at a particular temperature should be continued for at least a minimum amount of time, which at 120° C., is about six hours. However, as indicated hereinbefore, the preferred treatment time at 120° C. is 10 hours, and this preferred treatment time provides a product particularly adapted for flavoring ice cream.

The heat treatment of the solution may be carried out in the presence of the residual vanilla bean solids, or, alternatively, the residual vanilla bean solids may be removed and the solution alone may be subjected to heat treatment.

In this connection, it should be pointed out that the foregoing treatment is not directed toward increasing the rate or completeness of extraction of flavor components from the vanilla beans, although these benefits may also be enjoyed in accordance with the present invention if the solution is treated in the presence of the vanilla bean solids. However, as indicated, desirably improved flavor strength is obtained whether or not the solution of vanilla flavor components is treated in the presence of the marc. It is believed that the foregoing treatment causes reaction of certain of the flavor components to provide an increased flavor strength. The nature of this reaction is not fully understood, and is probably quite complex.

The solution of extractable vanilla bean components desirably comprises between about 35 percent and about 55 percent of alcohol. If the solution comprises substantially less than 35 percent alcohol, vanilla extract prepared in accordance with the present invention may include undesirable materials. If the solution comprises substantially more than 55 percent alcohol, the properties of the product are not substantially improved.

In this connection, it is observed that, if the solvent for the beans comprises substantially no water, the benefits of the present invention are not achieved. This is observed both when the beans include moisture and when the beans have been dried. Thus, it is possible that reaction of the vanilla flavor components does not proceed in the absence of water. In this connection, it has been found that the solvent should comprise at least about 10 percent water.

*Example I*

As an example of the practice of the present invention, 260 grams of wet vanilla beans and 750 milliliters each of ethanol and water were placed in a 2 liter stainless steel bomb equipped with a mechanical stirrer. The bomb was sealed and placed in an oil bath provided with a thermostatic temperature control. The bomb was heated to 80° C., and the contents of the bomb were maintained at that temperature for four hours with agitation, for extraction of the vanilla flavor components. At the end of four hours, the mixture was removed from the bomb, and the marc was separated from the resultant solution of extractable vanilla bean components.

The solution was divided into two portions and the first portion was set aside for aging at room temperature. The second portion of the solution was again placed in the bomb, the bomb sealed, and heated to about 120° C. The bomb and its contents were maintained at 120° C. for about 16 hours with continuous agitation, whereupon the bomb was quenched in cold water.

Both the first portion of the solution of extractable vanilla bean components, which was not subjected to heat treatment, and the second portion of the solution, which was subjected to heat treatment in accordance with the present invention, were allowed to age at room temperature for 30 days. At the end of this time, each of the solutions were evaluated for flavor strength by adding 0.4 milliliter of the solution to 100 milliliters of milk. The solution which was not subjected to heat treatment was considered to give the milk a bland flavor of low intensity, corresponding to that which might be expected from a conventional extraction procedure. The second portion of the solution, which was subjected to heat treatment, gave the milk a strong vanilla flavor of desirable character, and the solution was considered to have a flavor strength about four times as great as the first portion of the solution of extractable vanilla bean components.

*Example II*

As a further example of the practice of the present invention, 260 grams of wet vanilla beans and 750 milliliters each of ethanol and water were placed in the bomb of Example I and the bomb and its contents were heated to about 120° C. for about 16 hours with continuous agitation whereupon the bomb was quenched in cold water.

The mixture was thereupon removed from the bomb, and the marc was filtered from the resultant solution of extractable bean components. The solution was thereafter allowed to age at room temperature for 30 days. After the aging period the solution was flavor tested by adding about 0.4 milliliter of the solution to 100 milliliters of milk. The flavor strength and characteristics of the solution were considered equal in all respects to the heat treated solution of Example I.

*Example III*

As an additional example, 260 grams of wet vanilla beans and 750 milliliters each of ethanol and water were placed in the bomb of Example I. The bomb was sealed, placed in the oil bath of Example I, and the bomb and its contents were heated to about 110° C. The bomb and its contents were maintained at about 110° C. for about 16 hours with continuous agitation, whereupon the bomb was quenched in cold water.

The mixture was thereupon removed from the bomb, and the marc was separated from the resultant solution of extractable vanilla bean components. The solution was then allowed to age at room temperature for 30 days. After the aging period, the solution was flavor tested and about 0.4 milliliter of the solution was added to 100 milliliters of milk. The solution was considered to have a desirably improved vanilla flavor, which, although weaker than that obtained in accordance with Example II, was different in character from the first portion of Example I.

*Example IV*

As an additional example of the practice of the present invention, 260 grams of wet vanilla beans and 750 milliliters each of ethanol and water were placed in the bomb of Example I. The bomb was sealed, placed in the oil bath of Example I and the bomb and its contents were heated to about 105° C. The bomb and its contents were maintained at 105° C. for about 56 hours with continuous agitation, whereupon the bomb was quenched in cold water.

After filtration of the marc, the solution of extractable vanilla bean components was allowed to age at room temperature for 30 days. The solution of vanilla flavor components had desirably increased flavor strength, in comparison with the first portion of Example I, which was not subjected to treatment in accordance with the present invention.

*Example V*

Vanilla beans were treated in the same manner as set forth in Example IV, except that the bomb and its contents were heated to about 135° C. and maintained at that temperature for about 4 hours. After aging, the resultant solution of extractable vanilla bean components was considered to have desirably improved flavor strength in comparison with the first portion of Example I, which was not subjected to treatment in accordance with the present invention.

The solutions of extractable vanilla bean components obtained in accordance with Examples I, II, IV, and V not only have desirably improved flavor strength, but also produce a more pronounced and prolonged organoleptic effect in comparison with vanilla extracts heretofore known. In particular, the product of the present invention has a more prolonged organoleptic effect than does the product obtained when vanilla beans are extracted using conventional techniques or even known high-temperature techniques, such as 120° C. for 2 hours. The flavor properties of the product of the present invention indicate that different reaction products are produced under the particular treatment conditions set forth herein that have been present in vanilla extracts heretofore known.

Thus, there is provided a vanilla extract having desirably improved flavor strength. The improved flavor strength is obtained without a corresponding increase in the amount of vanilla beans required for preparation. At the same time, vanilla extract prepared in accordance with the present invention has a desirable flavor spectrum, and the extract may be utilized in various food products in the same manner as extracts heretofore known. However, lower levels of the extract of the present invention may be used to provide the same flavor level, or, alternatively, a higher flavor level may be enjoyed without substantially increased costs.

The foregoing description will immediately suggest various modifications to those skilled in the art. These modifications are deemed to be within the scope of the claims of the present invention.

Various of the features of the present invention are set forth in the following claims.

What is claimed is:

1. The method of treating a solution of extractable, cured vanilla bean components to increase the flavor strength thereof, comprising the steps of heating the solution to a temperature between about 105° C. and about 135° C., and maintaining the solution at such temperature for about 56 hours at the lower temperature and 4 hours at the higher temperature, wherein the solution comprises between 35 and 55 percent alcohol and at least about 10 percent water.

2. The method of treating a solution of extractable, cured vanilla bean components to increase the flavor strength thereof, comprising the steps of heating the solution to a temperature of about 120° C., and maintaining the solution at such temperature for at least about 6 hours, and until the desired flavor level is obtained, wherein the solution comprises between 35 and 55 percent alcohol and at least about 10 percent water.

3. The method of treating a solution of extractable, cured vanilla bean components to increase the flavor strength thereof, comprising the steps of heating the solution to a temperature of about 120° C., and maintaining the solution at such temperature for about 10 hours, wherein the solution comprises between about 35 and 55 percent alcohol and at least about 10 percent water.

4. A method of treating a solution of extractable vanilla bean components to increase the flavor strength thereof, comprising the steps of extracting cured vanilla beans with an alcoholic solvent, separating the residue from the resultant solution, and heating the solution to a temperature of about 120° C., and maintaining the solution at such temperature for about 10 hours, wherein the solution comprises between about 35 and 55 percent alcohol and at least about 10 percent water.

References Cited in the file of this patent

UNITED STATES PATENTS 2,358,947  Towt _____ Sept. 26, 1944

FOREIGN PATENTS 812,443  Great Britain _____ Apr. 22, 1959